March 5, 1929.  J. W. ASHWORTH  1,704,646
ADVERTISING AND DISPLAY DEVICE
Filed Dec. 31, 1926  4 Sheets-Sheet 1

INVENTOR.
John W. Ashworth
BY
Cornelius Zalinski
ATTORNEYS.

March 5, 1929. J. W. ASHWORTH 1,704,646
ADVERTISING AND DISPLAY DEVICE
Filed Dec. 31, 1926   4 Sheets-Sheet 3

INVENTOR.
John W Ashworth
BY
ATTORNEYS.

Fig. 6

Patented Mar. 5, 1929.

1,704,646

UNITED STATES PATENT OFFICE.

JOHN W. ASHWORTH, OF NEW YORK, N. Y.

ADVERTISING AND DISPLAY DEVICE.

Application filed December 31, 1926. Serial No. 158,151.

This invention is a device adapted for the attractive advertising and display of goods or wares in such manner as to command instant attention of all persons within view thereof.

The purpose of the present invention is primarily one of advertising and the broad general object of the invention is to provide an advertising medium which will command immediate attention and study. It is an animated construction and the advertising matter thereon is mounted to constantly move or rotate and, in the preferred form of the invention, such advertising matter is illuminated by rapidly changing colored lights, in order to give a very beautiful blending of color effects.

In its preferred practical form, the invention embodies a suitable hanger adapted to be supported from the ceiling or upon a track to permit it to travel. Upon the hanger is suspended a stirrup which forms a support for an electric motor. Mounted to rotate upon the hanger is a frame constructed to carry a plurality of advertising cards, at least some of which are preferably transparent. The frame is preferably so formed as to carry a series of show cards on its upper portion. Between its upper and lower portions are a plurality of colored transparent plates which generally lie in a substantially horizontal position, and in the preferred form of the invention are of segmental shape. Within the lower portion is one or more electric lamps which serve to illuminate the lower portion interiorly while the light is adapted to shine upwardly through the colored plates and to cast upon the advertising cards in the upper portion of the frame an exterior illumination in rapidly changing colors, due to rotation of the frame while the support and stirrup remain at rest.

Rotation is imparted to the frame through mechanical connections between the motor and the frame, so that the frame is mechanically driven. The frame has an antifriction mounting on the hanger in order that a relatively small low powered motor may be employed for this purpose. If desired, I may hang from the frame a basket and journal the same for rotation. A fan may be associated with and driven by the motor and the basket may be formed so that the down draught produced by the fan will impart rotation to the basket without mechanical drive between the parts. Moreover, it is within the purview of this invention to mount a plurality of baskets by either suspending them from the hanger or mounting them on a fixed support below the device and these baskets may be rotated either by a blast of air from the fan or they may be positively driven from the motor. The invention may partake of numerous forms, all calculated to catch the eye of a person in the vicinity and to draw attention to the device and the advertising matter carried thereby. The device is, however, relatively simple in construction and thoroughly efficient in its operation.

Features of the invention, other than those specified, will be apparent from the hereinafter detailed description and claims, when read in conjunction with the accompanying drawings.

The accompanying drawings illustrate different practical embodiments of the invention, but the constructions therein shown are to be understood as illustrative, only, and not as defining the limits of the invention.

Figure 1 shows the preferred form of the present invention, partly in section and partly in elevation.

Figure 1$^a$ is a fragmental section on the line 1$^a$—1$^a$ of Figure 1.

Referring to the drawings, 2 designates a pipe secured to the bottom of which is a stirrup 4. Embracing the pipe 2 is a tubular pillar 5, the upper portion of which carries an anti-friction bearing 6 and with the lower portion of which is associated an antifriction and thrust bearing 7, so as to mount the pillar for rotation on the pipe 2 with minimum friction.

Figure 3:
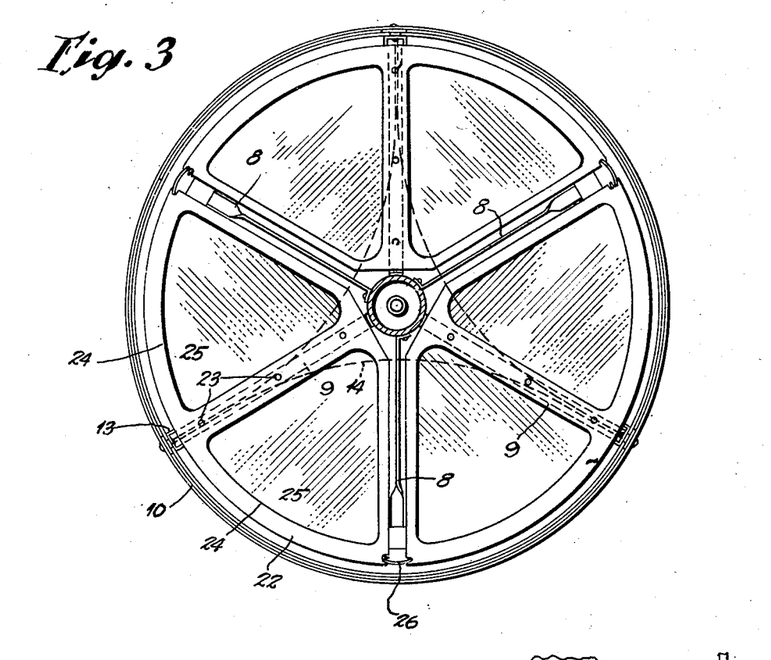
Figure 3 is a section on the line 3—3 of Figure 1 showing the transparent plates in plan.

Secured to and extending radially from the pillar just above the stirrup are straps 8 and 9, six of which are shown in Figure 3. These straps are all rigidly secured to the pillar at their inner ends, while their outer ends are rigidly secured to a hoop or ring 10. Near the upper end of the pillar are smaller straps 11, three in number, and supporting at their outer ends the ring or hoop 12. Three uprights 13 space the hoops 10 and 12 apart vertically. These uprights are of channel cross section, as shown in Figure 3, so that the opposite lateral edges of advertising cards 14 may be engaged with these channels shown in heavy dotted lines in Figure 3, for the purpose of supporting the advertising cards in position.

Depending from the hoop 10 are straps 15, the lower ends of which are secured to a hoop 16 and a finishing ring 17 for the purpose of mounting the hoop and said finishing ring in spaced relation below the hoop 10. There are six straps 15 in the construction shown in the drawings.

Juxtaposed with each strap 15 is a slightly spaced apart outer strap 18, and the straps 15 and 18 cooperate to clamp the lateral edges of show cards 19 adapted to be wrapped about that portion of the construction between the hoops 15 and 10, so as to form a substantially cylindrical drum.

The structure which I have last described as mounted upon the pillar constitutes a frame which is adapted to rotate with the pillar and to support the advertising cards as stated. It will be noted that on the upper portion of the frame, the cards 14 are exteriorly concave, while the cards 19 are exteriorly convex. This is to provide for combined interior and exterior illumination of the respective cards. The source of illumination is a plurality of electric lamps 20, mounted directly above the stirrup on a bracket 21, and as shown in the drawings, the bracket is in the form of a casting shaped to form a part of the thrust bearing 7 which rests directly on the top of the stirrup. This bracket may be of any suitable shape and may be constructed to carry any number of lights. It will be apparent, however, that when the lamps are energized, they will illuminate the cards 19 from within or by transmitted light, while the light from said lamps will shine upwardly and onto the exterior of the cards 14. In order to provide for coloring effects in the illumination of the cards 14, and for other reasons presently to be described, I mount upon the top of the drum portion of the frame, a plurality of segmental members 22. These segmental members are made of sheet metal and are secured to the straps 9 along their medial line. They are relatively flexible, and are provided with cut outs 24 in which are supported transparent colored plates 25 of glass, celluloid or the like.

Figures 1, 1A:
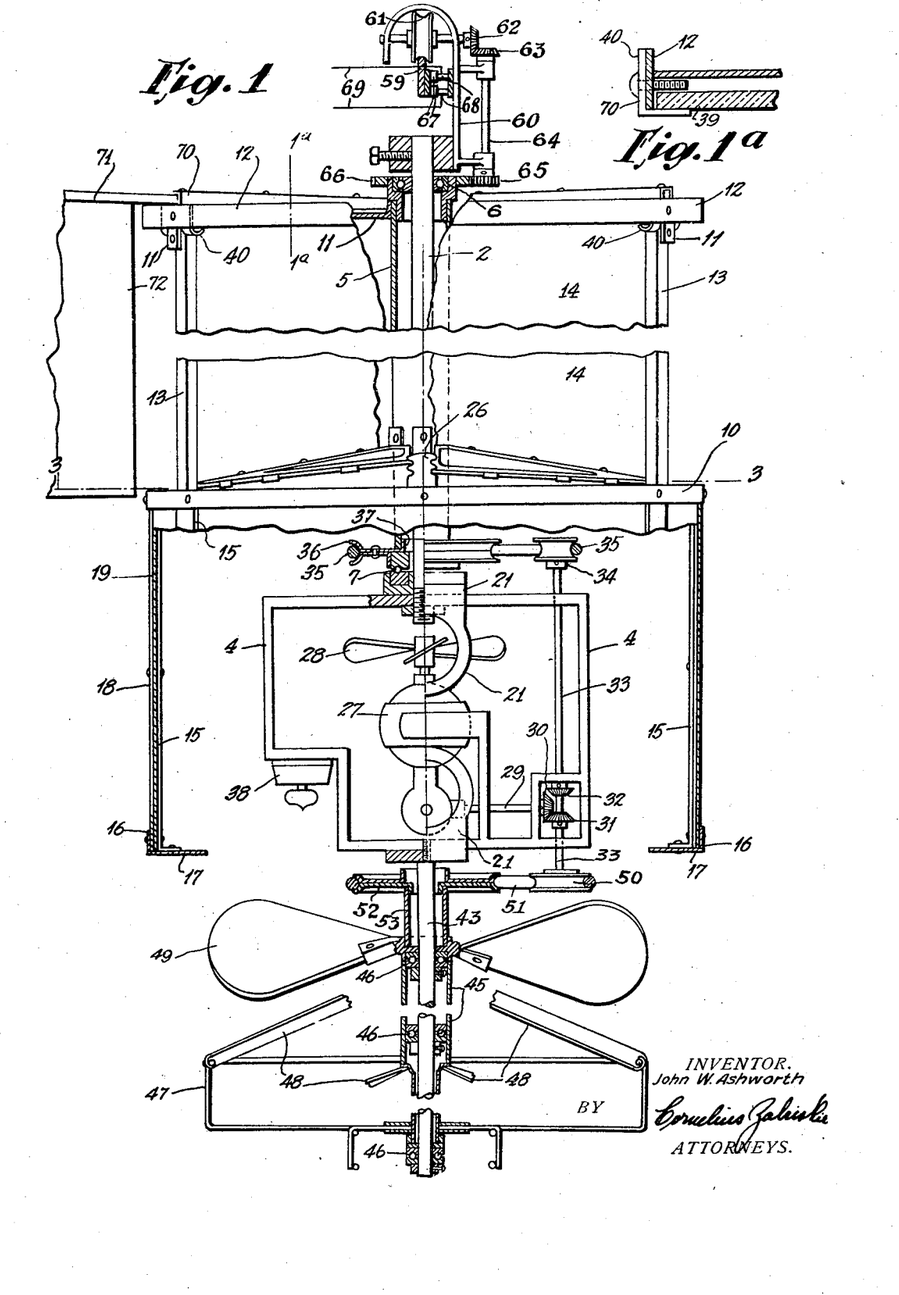

The lateral radial edges of the elements 22 are engaged with clips 26 slidably mounted upon the straps 8, whereby said clips may be engaged or disengaged with the elements 22, and it will be noted from Figure 1 that these clips have corrugated edges with any one of the corrugations of which edges, the edges of the elements are adapted to cooperate. By this manner of mounting, the lateral halves of each element may be tilted upwardly to any desired degree to control the passage of air through the top of the drum portion of the system.

It will be noted, however, that since the windows 25 are of different colors, light passing upwardly therethrough and impinging the cards 14 will be correspondingly colored. Moreover, if the frame is rotated while the lamps are stationary, it will follow that changeable color effects will result in the illumination of the upper cards 14.

Mounted rigidly within the stirrup is an electric motor 27. One end of the armature shaft carries a fan 28, while the other end of the armature shaft is geared to a counter shaft 29, which carries a bevel gear 30. This bevel gear is adapted to cooperate with bevel gears 31 and 32, fixed on a shaft 33. The upper end of the shaft 33 carries a pulley 34 and about this pulley passes a belt 35 which also embraces a pulley 36. The pulley 36 has a hub 37 which extends into the pillar 5 while the lower edge of the pillar rests upon the web of the pulley 36 which, in turn, rests upon the thrust bearing 7. As a result, the motor is adapted to rotate the pillar 5 in either one direction or the other depending upon which of the bevel gears 31, 32 is in engagement with the bevel gear 30 of the counter shaft 29.

This drive is moreover a traction drive since the pillar is not positively secured to the pulley 36, but merely rests upon it and is frictionally driven by it. It therefore follows that if, for any reason or other, the movement of the frame is arrested, the friction connection will merely slip without damaging any of the operating parts. The shaft 33 may be moved by hand to bring either of the gears 31 or 32 in engagement with the gear 30.

The switch 38 is shown as mounted on the stirrup. This switch is preferably a multipoint switch, whereby it is adapted to separately control the lights and the motor, so that the motor may be run without the lights or may be run with them.

When the motor is operated with the lamps illuminated, the frame will rotate and the cards 19 will be interiorly illuminated, while the cards 14 will be exteriorly illuminated. If it is desired to further illuminate the cards 14, mirrors 39, substantially segmental in form, may be associated with the upper hook 12, as shown in Figure 1ª, and they may be held in place by clips 40, as shown in this figure and in Figure 1, so that light impinging the mirrors 39 will be reflected downwardly again on to the cards 14. Some very beautiful color effects may be accomplished in this manner.

Figure 2:
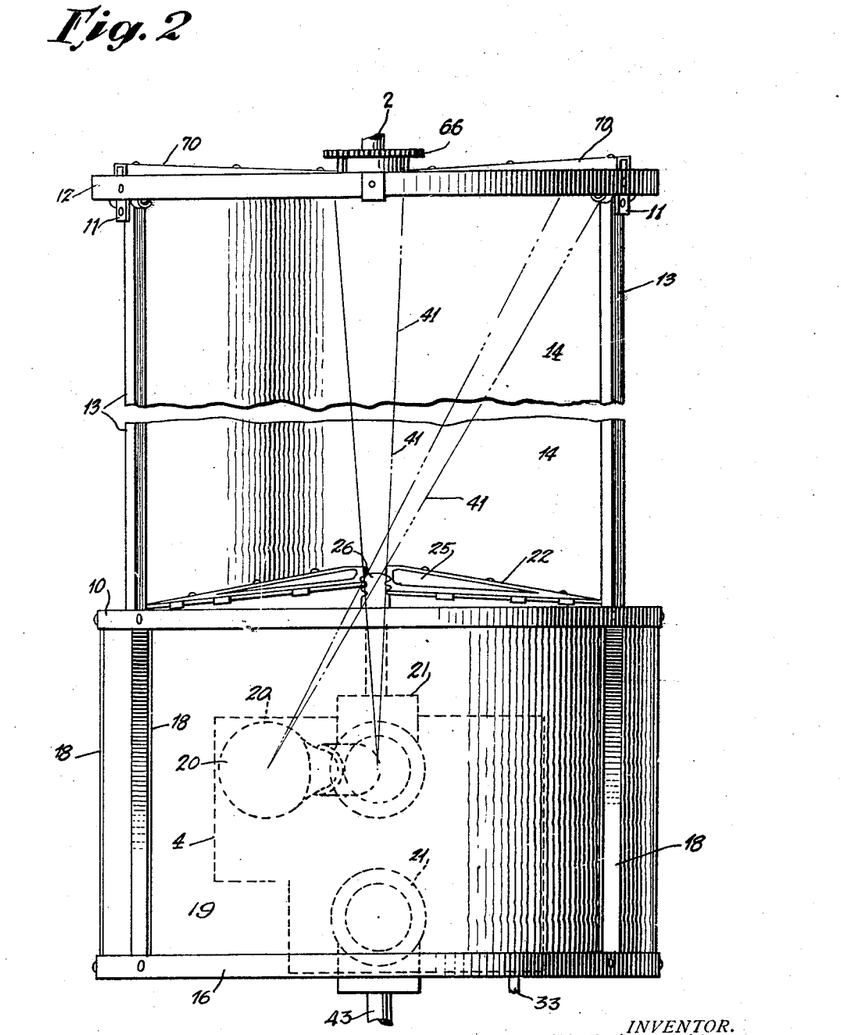
Figure 2 is a side elevation showing a portion of the construction shown in Figure 1.

It will be noted from Figures 2 and 3 in particular that the contiguous edges of adjacent segmental plates 22 are spaced apart a short distance, and as a result light from the lamps 20 will shine through these spacers and cast upon the cards 14 a pencil like beam of white light 41. This beam of light will shift over the cards 14 after the manner of a searchlight as the frame is rotated, while the lamps 20 are stationary. It is found in practice that as the frame turns, this white light pencil or searchlight effect will travel over the cards 14 and partake of numerous consecutive positions, two of which are shown in Figure 2, so as to assist in attracting attention and imparting to the display a more or less mysterious effect useful in advertising displays.

In the construction of Figures 1 to 3, the stirrup is provided at its bottom with a spindle 43, the upper end of which is threaded into the stirrup. Encircling the spindle 43 is a tubular member 53 to which is secured a pulley 52 and around this pulley is passed a belt 51 which encircles a pulley 50 on the lower end of the shaft 33, so that the tube 53 is rotated by power supplied from the motor. The tube 53 is secured to the hub of a fan 49. The coaxial tube 45 is mounted for rotation on the spindle by bearings 46. At the lower end of the tube 45 are radial arms in the form of vanes 48 which support a basket 47 adapted to hold small articles which it is desired to display. The fan 49 is provided with suitable blades which, in practice, may be of colored glass and these vanes are so set that a draft of air passing through the display frame will rotate the basket. When the fan has colored vanes very pleasing colored effects are produced when the fan is rotated.

Figure 5:
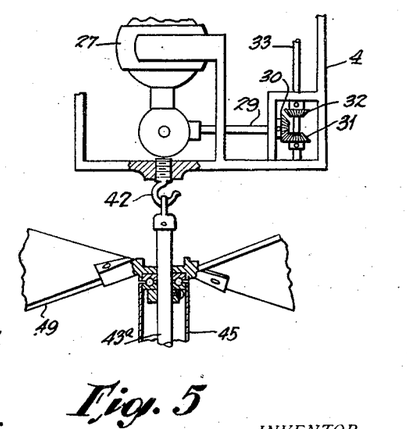
Figure 5 is a fragmental view, partly in section and partly in elevation, showing a modified form of the invention.

Instead of driving the fan and basket by pulley and belt connection as shown, I may dispense with the tube portion 53 and the belt and pulley connection and mount the fan as shown in Figure 5, so that the draft of air to which I have referred will cause the fan and basket to rotate. Moreover, instead of threading the spindle 43 into the stirrup, the stirrup may be provided with a hook 42 and the upper end of the spindle 43ª may be provided with an eye to engage with the hook as shown in Figure 5. Other modifications of the general arrangement may be made in a similar manner without departing from this invention.

Figure 6:
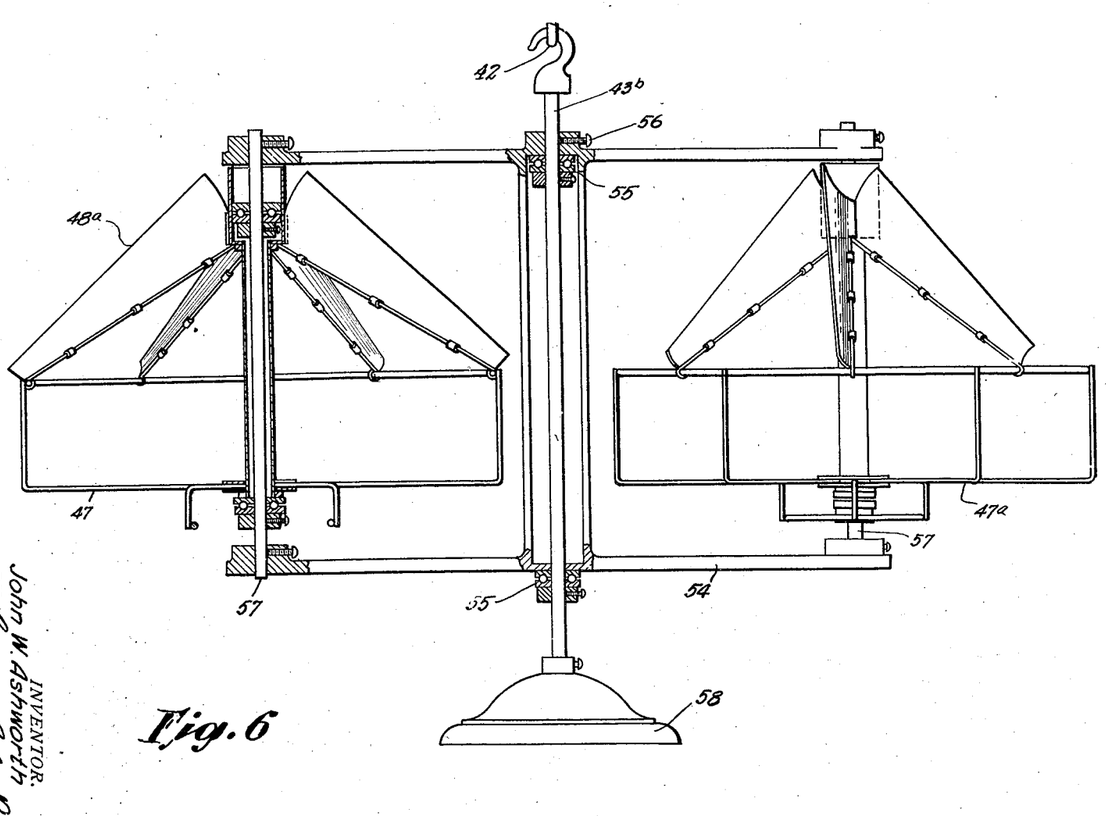
Figure 6 shows a modified form of basket arrangement and supporting means.

In the construction, as thus far described, there is a single basket associated with the display device. In Figure 6, however, I have shown how a plurality of baskets may be employed. In this view, the spindle 43ᵇ which corresponds to the spindle 43 is suspended on the hook 42 and mounted to rotate on said spindle is a frame-work 54 having associated therewith antifriction bearings 55. A set screw 56 is provided to lock the frame work against rotation on the spindle if desired. The frame-work 54 carries two or more additional spindles 57 on each of which a basket 47ª is mounted to rotate. Each of these baskets 47ª have vanes 48ª corresponding in structure and function to the vanes 48 of Figure 1, but, in practice, the pitches of the vanes of these two baskets of Figure 6 are preferably the same, so that when a blast of air from the fan 28 strikes these vanes, it will rotate the two baskets in the same direction.

My experience with this type of device has shown that if the set screw 56 is loosened, the frame work 54 will bodily rotate while the baskets are individually rotated, so that practically all parts of the apparatus exposed to view are animated and will be bound to attract attention. The baskets have been described as supported from the stirrup, but it is within the purview of this invention to associate with the spindles 43, 43ª or 43ᵇ a suitable base 58, as shown in Figure 6, so that instead of suspending the spindles, they may rest upon a firm support.

In Figures 1 and 2 a construction is illustrated, which will permit the device to travel along a track. In this view 59 designates a track which may be circular or otherwise. A trolley 60 carries one or more rollers 61 which ride on the track. The axle of one of the rollers carries a bevel gear 62 which meshes with the bevel gear 63 carried on the shaft 64. The shaft 64 carries a gear 65 which meshes with the gear 66 mounted on the pillar 5. As a result, rotation of the pillar will be transmitted to the roller 61 to cause it to traverse the track and result in bodily movement of the device. If desired, there may be mounted upon the track contact strips 67 insulated from one another and from the track and energized by electrical current and brushes 68 may bear against these strips 67 to provide for feed of current through the wires 69 to the switch 38, whereby the lamps and motor are energized.

Figure 4:
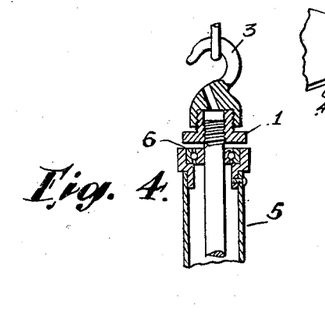
Figure 4 shows a modified form of mounting the construction.

If desired, however, I may dispense with the means for causing travel of the device as illustrated in Figure 1 and secured to the top of the pipe is a hanger 1 to which is secured a hook 3 adapted to engage with a suitable screw eye adapted to be screwed into a ceiling or other suitable support as shown in Figures 4 and 6.

To increase the advertising space on the frame, the frame is provided at its top with holders 70. Into these holders may be slipped bars 71 to project beyond the periphery of the hoops 12 and on these bars may be suspended banners 72 carrying advertising matter.

The advertising device which I have described embodies numerous movable parts, all calculated to attract the attention, and I have found, in practice, that said device is an unusually efficient advertising medium. It readily catches the eyes of all in the vicinity and there being attendant an air of mystery in its operation, it holds the attention sufficiently to insure a reading of all of the advertisements carried thereby. Moreover, the lighting effects are such as to produce an unusually aesthetic appearance, particularly because of the beautiful color effects which may be obtained by the construction described. The upper series of advertising cards 14 are exteriorly illuminated by light passing through the colored windows 25. The particular inclination of the members 22 which carry these windows does not materially affect the illumination of these upper cards, but by the tilting of these elements to engage with different serrations or corrugations of the clips 26, a draught from the fan 28 may serve to rotate the frame, or assist the motor in so doing. It will of course be understood that the pitch of the fan should be such as to throw a draft in an upward direction to obtain the full advantages of this construction, but I have found in practice that the basket and other means suspended beneath the stirrup can be positively driven, and the frame supported on the column 5 may be driven by a draught of air from the fan 28. It will therefore appear that the structure shown is capable of modification without departing from the spirit of the invention which is to be understood as fully commensurate with the appended claims.

It will of course be understood that the driving of the frame by a draught of air from the fan is accomplished by properly manipulating the elements 22 on the hinge connection as described and they may be adjusted at the desired inclination by the clips 26. The angle of inclination will, moreover, control the speed at which the frame is driven in this manner, and I can also control the direction of rotation by raising one radial edge from the other of the respective elements 22, so that either lateral half of the segment will operate as a vane to effect the turning movement.

Having thus fully described the invention, what I claim as new and desire to secure by Letters Patent is:

1. In an apparatus of the character described, a frame mounted to rotate and adapted to support a plurality of advertising cards in upstanding positions, a source of illumination within the frame, translucent advertising cards carried by the frame in upstanding positions and adapted to be interiorly illuminated from the source of illumination, additional advertising cards carried by said frame in upstanding positions and adapted to be exteriorly illuminated from said source of illumination, and a motor for rotating said frame.

2. In an apparatus of the character described, a frame mounted to rotate on a vertical axis, one portion of the height of the frame being adapted to support a plurality of advertising cards on its outer periphery and another portion of the frame being adapted to support advertising cards inwardly of its outer periphery, illuminating means within the first mentioned portion of the frame for illuminating the cards associated therewith interiorly and for illuminating those cards on the other portion of the frame exteriorly, colored windows between the respective portions of the frame to color the rays of light by which the latter cards are illuminated, and motor driven means for rotating said frame.

3. In an apparatus of the character described, a supporting rod, a frame mounted to rotate thereon, a plurality of advertising cards carried by the frame, and means interiorly of the frame for illuminating the same, in combination with a stirrup carried by the supporting rod, a motor mounted on the stirrup, and operative connections between the motor and the frame to mechanically drive the frame from the motor, said operative connections embodying friction drive means, whereby exterior interference with the rotation of the frame will not detrimentally affect the driving connections between the frame and the motor.

4. In an apparatus of the character described, a supporting rod, a frame mounted on the supporting rod for rotation, a plurality of advertising cards carried by the frame, illuminating means carried by said supporting rod, a motor also carried by the supporting rod, and operative connections between the motor and the frame, including friction drive means, for rotating the frame from the motor.

5. In an apparatus of the character described, a supporting rod, a frame mounted on the supporting rod for rotation, a plurality of advertising cards carried by the frame, illuminating means carried by said supporting rod, a motor also carried by the supporting rod, operative connections between the motor and the frame, including friction drive means, for rotating the frame from the motor, and means also included in said operative connections to reverse the direction of drive of the frame without reversing the direction of operation of the motor.

6. In an apparatus of the character described, a supporting member, a frame mounted on the supporting member for rotation, a plurality of advertising cards carried by the frame, illuminating means also carried by the frame for illuminating said cards, in combination with a motor carried by the supporting member, operative connections between the motor and the frame, whereby the frame is driven from the motor, an article carrier mounted on the supporting member for rotation relative thereto, and means for imparting rotation to the article carrier.

7. In an apparatus of the character described, a supporting member, a frame mounted on the supporting member for rotation, a plurality of advertising cards carried by the frame, illuminating means also carried by the frame for illuminating said cards, in combination with a motor carried by the supporting member, operative connections between the motor and the frame, whereby the frame is driven from the motor, an article carrier mounted on the supporting member for rotation relative thereto, vanes associated with the article carrier, and a fan carried by the supporting member and operable by the motor to direct a blast of air against the vanes of the article carrier for the purpose of rotating said carrier.

8. In an apparatus of the character described, a supporting member, a frame mounted on the supporting member for rotation, a plurality of advertising cards carried by the frame, illuminating means also carried by the frame for illuminating said cards, in combination with a motor carried by the supporting member, operative connections between the motor and the frame, whereby the frame is driven from the motor, an article carrier mounted for rotation beneath the frame and provided with vanes, and a fan associated with the motor and driven thereby to force a blast of air against the vanes of the article carrier for the purpose of rotating the latter.

9. In an apparatus of the character described, a supporting member, a frame mounted on the supporting member for rotation, a plurality of advertising cards carried by the frame, illuminating means also carried by the frame for illuminating said cards, in combination with a motor carried by the supporting member, operative connections between the motor and the frame, whereby the frame is driven from the motor, a fan associated with and operated by the motor to force a blast of air in a downward direction, and rotatable means positioned in the path of said blast of air and rotated thereby.

10. In an apparatus of the character described, a suitable track, a wheeled trolley mounted to traverse the track, a supporting member suspended from the trolley, a frame mounted to rotate on the supporting member, advertising cards on said frame, a motor carried by the supporting member, driving connections between the motor and the frame to rotate the frame from the motor, and driving connections between the frame and the wheel of the trolley to impart rotation to the wheel and cause the device to travel longitudinally of the track.

11. In an apparatus of the character described, a suitable track, a wheeled trolley mounted to traverse the track, a supporting member suspended from the trolley, a frame mounted to rotate on the supporting member, advertising cards on said frame, a motor carried by the supporting member, and driving connections between the motor and the frame and the motor and the wheel of the trolley, whereby the frame is rotated and the trolley caused to travel longitudinally of the track.

12. In an apparatus of the character described, a suitable track, a wheeled trolley mounted to traverse the track, a supporting member suspended from the trolley, a pillar mounted to rotate on the supporting member, a frame carried by the pillar for rotation therewith, advertising cards carried by the frame, a motor carried by the supporting member, and driving connections between the motor and the pillar and between the pillar and the wheel of the trolley, whereby the frame is rotated, and the trolley is moved longitudinally of the track.

13. In an apparatus of the character described, a frame mounted to rotate on a vertical axis, the upper and lower portions of which frame are adapted to support advertising cards, illuminating means within one portion of the frame for interiorly illuminating the cards associated with said portion, and for exteriorly illuminating the cards associated with the other portion, said frame carrying between the respective portions a partition having slots formed therein through which light may pass from the illuminating means to impinge upon the exteriorly illuminated cards, said illuminating means being stationary with respect to the rotatable frame, whereby a beam of light, producing a searchlight effect, will be caused to traverse the exteriorly illuminated cards when the frame is rotated.

14. In an apparatus of the character described, a fixed support, a frame mounted to rotate thereon, show cards mounted on the lower portion of the frame in exteriorly convex condition thereon, show cards mounted on the upper portion of the frame in exteriorly concave condition, a partition between the upper and lower portion of the frame, said partition being provided with radial slots, and a source of illumination interiorly of the lower portion of the frame and mounted on the fixed support, whereby light from the source of illumination will pass through the slots in the partition in the form of beams and embodying the cards in the upper portion of the frame after the manner of a searchlight adapted to move across said cards when the frame rotates.

15. In an apparatus of the character described, a fixed support, a frame mounted to rotate thereon, show cards mounted on the lower portion of the frame in exteriorly convex condition thereon, show cards mounted on the upper portion of the frame in exteriorly concave condition, a partition between the upper and lower portion of the frame, said partition being provided with radial slots, and a source of illumination interiorly of the lower portion of the frame and mounted on the fixed support, whereby light from the source of illumination will pass through the slots in the partition in the form of beams and embodying the cards in the upper portion of the frame after the manner of a searchlight adapted to move across said cards when the frame rotates, said partition embodying colored translucent material through which the source of light may also shine to cast colored lights upon the cards carried by the upper portion of the frame.

16. In an apparatus of the character described, a fixed support, a frame mounted to rotate thereon, show cards mounted on the lower portion of the frame in exteriorly convex condition thereon, show cards mounted on the upper portion of the frame in exteriorly concave condition, a partition between the upper and lower portion of the frame, said partition being provided with radial slots, a source of illumination interiorly of the lower portion of the frame and mounted on the fixed support, whereby light from the source of illumination will pass through the slots in the partition in the form of beams and embodying the cards in the upper portion of the frame after the manner of a searchlight adapted to move across said cards when the frame rotates, said partition embodying colored translucent material through which the source of light may also shine to cast colored lights upon the cards carried by the upper portion of the frame, and segmental portions of said partition being mounted for pivotal movement, whereby they may be set at desired angles of inclination.

17. In an apparatus of the character described, a fixed support, a frame mounted to rotate thereon, show cards mounted on the lower portion of the frame in exteriorly convex condition thereon, show cards mounted on the upper portion of the frame in exteriorly concave condition, a partition between the upper and lower portion of the frame, said partition being provided with radial slots, a source of illumination interiorly of the lower portion of the frame and mounted on the fixed support, whereby light from the source of illumination will pass through the slots in the partition in the form of beams and embodying the cards in the upper portion of the frame after the manner of a searchlight adapted to move across said cards when the frame rotates, said partition embodying colored translucent material through which the source of light may also shine to cast colored lights upon the cards carried by the upper portion of the frame, segmental portions of said partition being mounted for pivotal movement, whereby they may be set at desired angles of inclination, and means mounted on the fixed support for rotating the frame.

18. In an apparatus of the character described, a fixed support, a frame mounted to rotate thereon, show cards mounted on the lower portion of the frame in exteriorly convex condition thereon, show cards mounted on the upper portion of the frame in exteriorly concave condition, a partition between the upper and lower portion of the frame, said partition being provided with radial slots, a source of illumination interiorly of the lower portion of the frame and mounted on the fixed support, whereby light from the source of illumination will pass through the slots in the partition in the form of beams and embodying the cards in the upper portion of the frame after the manner of a searchlight adapted to move across said cards when the frame rotates, said partition embodying colored translucent material through which the source of light may also shine to cast colored lights upon the cards carried by the upper portion of the frame, segmental portions of said partition being mounted for pivotal movement, whereby they may be set at desired angles of inclination, a motor carried by the fixed support, and operative connections between the motor and the frame to permit the motor to rotate the frame.

19. In an apparatus of the character described, a fixed support, a frame mounted to rotate thereon, show cards mounted on the lower portion of the frame in exteriorly convex condition thereon, show cards mounted on the upper portion of the frame in exteriorly concave condition, a partition between the upper and lower portion of the frame, said partition being provided with radial slots, a source of illumination interiorly of the lower portion of the frame and mounted on the fixed support, whereby light from the source of illumination will pass through the slots in the partition in the form of beams and embodying the cards in the upper portion of the frame after the manner of a searchlight adapted to move across said cards when the frame rotates, said partition embodying colored translucent material through which the source of light may also shine to cast colored lights upon the cards carried by the upper portion of the frame, segmental portions of said partition being mounted for pivotal movement, whereby they may be set at desired angles of inclination, a motor carried by the fixed support, operative connections between the motor and the frame to permit the motor to rotate the frame, and article supporting members rotatably suspended on the fixed support.

20. In apparatus of the character described, a suporting member, a frame mounted on the supporting member for rotation, advertising cards carried by the frame, a motor mounted on the supporting member, a fan suspended from the supporting member, and means operable by the motor to rotate the frame and the fan.

21. In apparatus of the character described, a supporting member, a frame mounted on the supporting member for rotation, advertising cards, carried by the frame, a motor mounted on the supporting member, a fan suspended from the supporting member, means operable by the motor to rotate the frame and the fan, and means also carried by the supporting member for illuminating the advertising cards.

In testimony whereof I have signed the foregoing specification.

JOHN W. ASHWORTH.